Nov. 7, 1950
C. J. CADWELL ET AL
2,528,855
APPARATUS FOR USE IN ASSOCIATION WITH
TWO PICTURE PROJECTOR MACHINES
Filed May 16, 1949
2 Sheets—Sheet 1
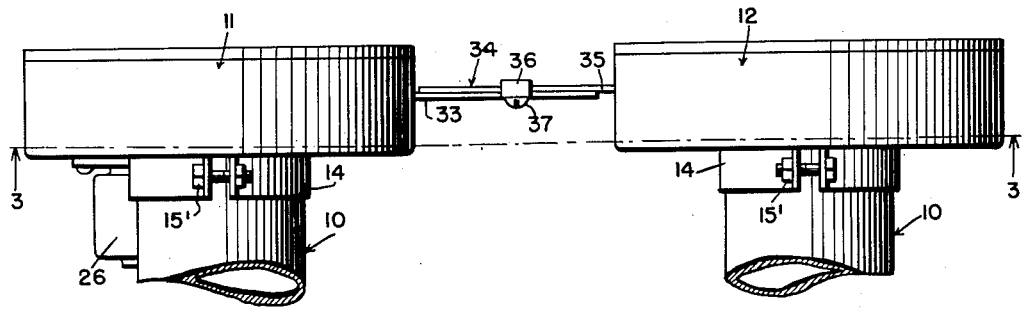
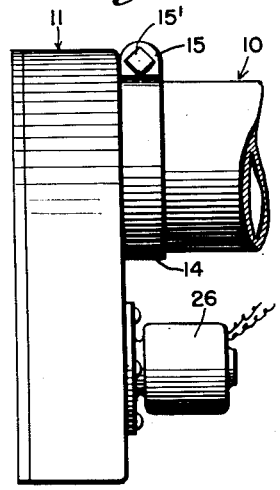
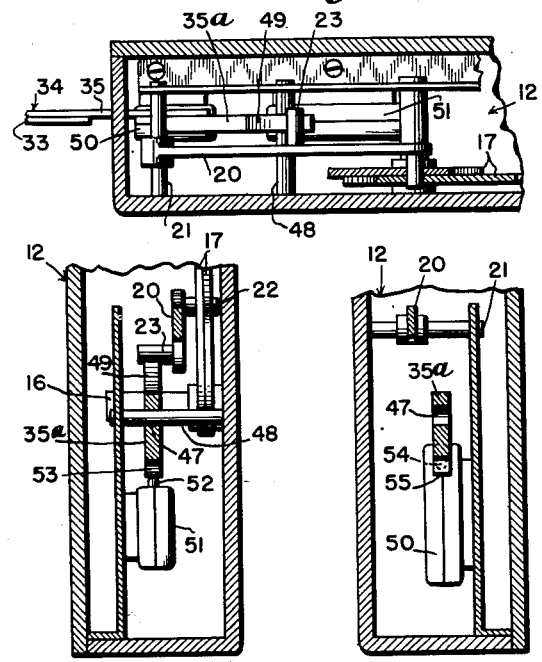
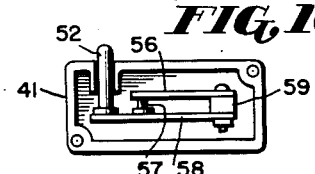
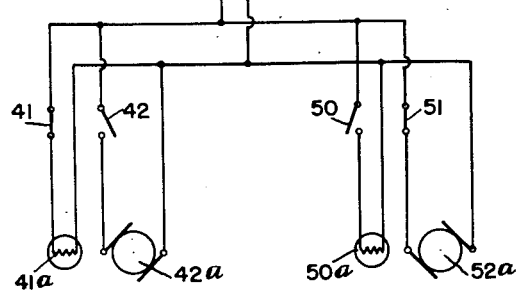
Inventor
Clarence J. Cadwell
Frank M. Adamson
By Wilfred E. Lawson
Attorney

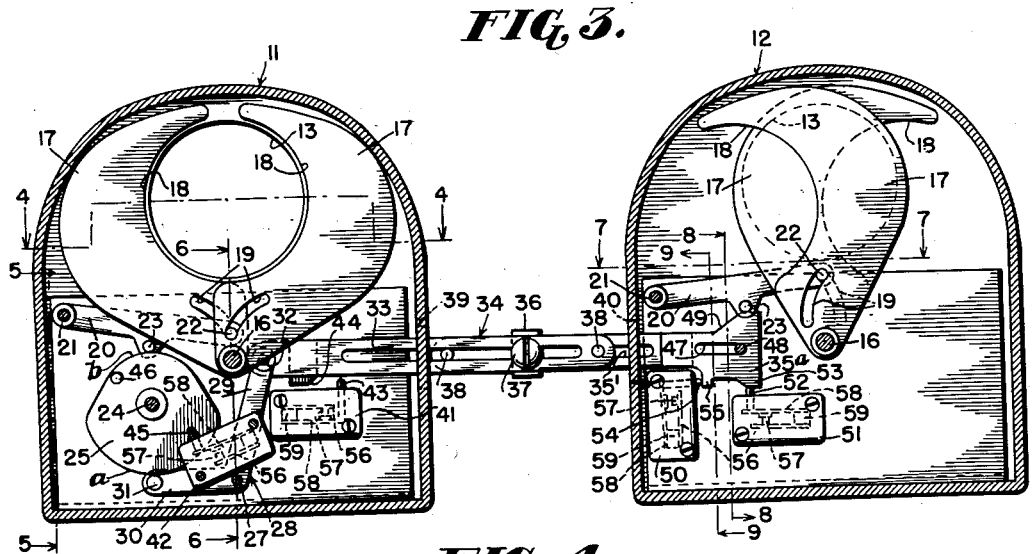

Patented Nov. 7, 1950

2,528,855

UNITED STATES PATENT OFFICE 2,528,855

APPARATUS FOR USE IN ASSOCIATION WITH TWO PICTURE PROJECTOR MACHINES

Clarence J. Cadwell, Carpinteria, and Frank M. Adamson, Los Angeles, Calif., assignors to The Cadwell Corporation, Beverly Hills, Calif., a corporation of California Application May 16, 1949, Serial No. 93,581

4 Claims. (Cl. 88—24)

This invention relates generally to the class of still picture projecting and is directed particularly to improvements in apparatus for use in association with two projector machines for simultaneously dissolving a picture projected by one machine and developing in its place a picture projected by the adjacent machine.

The apparatus of the present invention is designed particularly for use in association with those still picture projecting machines wherein motor operated mechanism is employed for automatically removing one picture from projecting position and moving a succeeding picture into position and it is a principal object of the present invention to provide an apparatus whereby in addition to closing off the light aperture of one projecting machine and uncovering the light aperture of an adjacent machine means is provided for automatically setting into motion the picture change mechanism and extinguishing the light source of the machine in which the light aperture is covered and simultaneously energizing the light source and discontinuing the operation of the picture change mechanism of the machine in which the light aperture is uncovered.

Another object of the invention is to provide a double picture dissolver of the character above set forth, wherein a novel mechanical arrangement is provided for operating the leaves of a pair of shutter units and for effecting the opening and closing of control switches for the light sources of the two machines and the picture changing mechanism for the two machines, all from a single actuating cam.

A still further object of the invention is to provide a dual picture dissolver for use with a pair of still picture projecting machines of the character stated, wherein the mechanism is of relatively simple design and so constructed and laid out as to reduce to a minimum the possibility of failure of the parts to function smoothly and to get out of order.

The invention will be best understood from a consideration of the following detailed description taken in connection with the accompanying drawing forming a part of the specification, with the understanding, however, that the invention is not to be limited to the exact details of construction shown and described since obvious modifications will occur to a person skilled in the art.

In the drawing:

Figure 1 is a view in top plan of two coupled units constructed in accordance with the present invention, each of which is shown mounted upon the lens or light projecting tube of a picture projecting machine.

Figure 2 is a view in side elevation of one of the units shown in Figure 1.

Figure 3 is a sectional view on a vertical plane taken substantially on the line 3—3 of Figure 1.

Figure 4 is a horizontal section taken substantially on the line 4—4 of Figure 3.

Figure 5 is a partial section taken substantially on the line 5—5 of Figure 3.

Figure 6 is a partial section taken substantially on the line 6—6 of Figure 3.

Figure 7 is a partial horizontal section taken substantially on the line 7—7 of Figure 3.

Figure 8 is a partial vertical section taken substantially on the line 8—8 of Figure 3.

Figure 9 is a partial vertical section taken substantially on the line 9—9 of Figure 3.

Figure 10 is a view in plan illustrating a simple form of switch such as might be used in the present apparatus.

Figure 11 is a wiring diagram for the projector lamps and the motors which operate the picture change mechanism.

Referring now more particularly to the drawing each of the reference numerals 10 designates a light tube forming a part of a standard still picture projection machine of any one of several well known types wherein pictures are successively shifted from a magazine to a position before a lens of the projector and already exhibited pictures are removed to a receiver, by means of a switch operated solenoid or rotary motor. Since such machines as well as the mechanism for effecting the automatic changing of the slides are of standard and well known construction it is not deemed necessary to illustrate or further describe the same in order to make a clear and definite disclosure of the invention of the present application.

In accordance with the present invention there are provided the two housings 11 and 12 which are of relatively flat or thin form and each of which has in the front and rear walls thereof the aligned openings or windows 13 through which the light beam passes from an adjacent lens tube 10.

The housings may be mounted in any suitable or desired manner to have the lens tube 10 coaxial with the housing openings or windows 13, the means here illustrated comprising a split collar 14 forming a part of the back wall of each housing, in which the forward end of a lens or light tube 10 is engaged, the collar being tightened on the tube in any suitable manner as, for example, by means of the spaced ears 15 which are drawn together by a bolt 15'.

Within each housing, directly below the center of a window opening, a wall supports a pivot pin 16 upon which are mounted for relative rocking movement a pair of leaves 17 which cooperate to form a shutter unit. These leaves have adjacent edges provided with the substantially semi-circular recesses 18 which are of a radius corresponding to the radius of the window openings 13. As shown when the leaves 17 are swung apart to the maximum extent upon the supporting pivot 16 the substantially semi-circular recesses 18 are slightly outside the edges of the adjacent window openings so that such openings are entirely uncovered whereas when the leaves 17 are swung together to the maximum extent as shown at the right in Figure 3 they overlap and form a complete shield for the light openings 13.

Directly above the pivot 16 for each pair of leaves, each leaf has formed therein an arcuate slot 19, the lower ends of which slots are overlapping as shown at the left of Figure 3 when the leaves are separated so that the curvature of the slots is divergent whereas when the leaves are in closed relation to cover the window openings 13 the slots 19 are convergent at their upper ends and such upper ends are in overlapped relation as shown at the right of Figure 3.

Each pair of shutter leaves is directly connected with and actuated by an operating arm 20. One end of such arm is pivotally mounted as at 21 upon a suitable pivot member at one side of the pair of leaves while the opposite end of the arm has limited free swinging movement and carries a cam slot pin 22 which extends through and slidably engages in the adjacent pair of slots 19. Thus it will be seen that when the pin 22 is in the lower ends of the slots 19, at which time the leaves 17 will be separated to uncover the light windows 13, and an upward thrust is applied to the arm 20, the pin 22 will apply thrust to the edges of the slots 19 and cause the leaves to swing together into overlapping relation, such movement of the arm ceasing when the pin 22 reaches the upper ends of the slots 19 as will be readily obvious.

Each of the arms 20 carries a cam follower pin 23 which is engaged by an actuating cam, hereinafter described, to effect the desired oscillation of the shutter leaves 17.

Within one housing, here shown as the housing 11, there is mounted upon a shaft 24 which may extend transversely through the housing between the front and rear walls, a rotating cam which is generally designated 25 and which has the diametrically oppositely positioned high and low sides $a$ and $b$ respectively. The periphery of this cam is positioned to have the cam follower pin 23 of the adjacent arm 20 ride thereon whereby when the low side of the cam is uppermost as shown the arm 20 will be lowered and the shutter leaves 17 will be separated and when the cam has made a rotation of 180° the high side will be engaged with the pin 23 and the arm elevated to swing the leaves 17 to closed position.

The shaft 24 forms a part of the armature, not shown, of an operating electric motor 26 which may be mounted upon the rear side of the housing 11 as shown in Figure 5 or may be supported in any other suitable manner. This shaft 24 may be, if desired, a part of any other suitable driving mechanism operated by a motor, instead of forming an actual integral part of the armature of the motor as stated.

Pivotally mounted on a wall of the housing 11, as at 27, is a bell crank lever which is generally designated 28 and which comprises a long arm 29 and a short arm 30.

The short arm 30 carries a laterally projecting pin 31 which extends across the periphery of the cam wheel 25 to be engaged thereby in the rotation of the wheel to effect the oscillation of the bell crank.

At the free end of the long arm 29 of the bell crank there is pivotally connected as at 32 an end of a section 33 of a longitudinally adjustable or extensible coupling bar 34 which, in addition to the section 33 includes a second section 35. The sections 33 and 35 are provided with longitudinal slots 33' and 35' and they are in end overlapping relation as shown and are adjustably connected together by means of a plate 36 having an aperture, not shown, for the reception of a threaded screw 37 which extends through the slots 33' and 35'. To further facilitate the maintainence of the sections 33 and 35 in parallel relation each of the sections at the outer or overlapping ends carries a pin 38 which slidably engages in the slot of the adjacent section.

The bar 34 extends through an opening 39 in an edge wall of the housing 11 and through a corresponding edge wall opening 40 in the adjacent housing 12 so that the bar section 35 has one end within the housing 12 as illustrated.

Within the housing 11 there are mounted two electric circuit controlling switches which are designated 41 and 42. The switch 41 controls the circuit for the incandescent lamp of the projector to which the housing 11 is attached and the switch 42 controls the electric circuit for the slide mechanism operating motor for the same projector.

The switch 41 includes an operating button 43 and such switch is positioned so that this button is in the path of movement of an actuator finger 44 which is carried by the bar section 33 adjacent to that end which is pivotally connected with the bell crank 28.

The switch 42 is of similar construction to the switch 41 in that it carries an actuating button 45 which is positioned adjacent to the cam wheel 25 and is adapted to be engaged and depressed by a finger 46 mounted upon the face of the cam wheel.

The inner end of the bar section 35 which is disposed within the housing 12, is formed to provide a head 35a. In this head is formed a slot 47 in which engages a fixed pin 48 which is carried upon an adjacent wall of the housing. The head 35a is disposed beneath the cam follower pin 23 of the adjacent arm 20 and the top edge of the head is formed to provide the sloping caming edge or surface 49 which is contacted by the adjacent pin 23 so that when the bar 34 moves outwardly toward the housing 11 the caming surface 38 moves under the pin 23 and exerts an upward thrust thereon thus effecting the closing or overlapping of the shutter leaves as illustrated.

Adjacent to the lower edge of the inner end of the bar section 35 are positioned the two electric circuit controlling switches 50 and 51. The switch 50 controls the electric circuit for the incandescent lamp of the projector to which the housing 12 is attached while the switch 51 controls the electric circuit for the slide change mechanism operating motor of the same projector.

The switch 51 includes an operating button 52 which is engaged by an actuating finger 53 forming a part of the bar section head 35a, when the bar moves to the left or in the direction to close the shutter leaves and the closing of the switch by the depression of the button 52 energizes the slide change mechanism operating motor for the projector. At the same time the corresponding button 54 for the light control switch 50 is engaged by a finger 55 also forming a part of the head 35a and depressed to open the switch 50 thereby extinguishing the light of the projector.

Figure 11 shows a simple electric circuit illustrating the connections for the light and motor switches and showing diagrammatically the motors and lights for the projectors. The diagram illustrates the condition of the switches corresponding with the positions of the shutter unit leaves in Figure 3 and with the condition of the electric lamp associated with each projector. As shown in this circuit diagram the control switch 41 for the incandescent lamp 41a is closed while the control switch 42 for the slide change mechanism operating electric motor 42a is open thus indicating that a picture is being shown, at which time the change mechanism is inoperative.

In association with the projector to which the housing 12 is attached the light control switch 50 is shown in open condition indicating, of course, that the projection machine lamp 50a is inactive while the switch 51 is shown closed, which switch controls the operation of the slide change mechanism operating electric motor 52a thus indicating that when the lamp 50a is deenergized the shutter leaves 17 in the housing 12 will be closed over the light transmitting windows 13 and the motor 52a is in operation to change the slides of the projector.

Any desirable or suitable type of electric switch may be used for controlling the light and motor circuits. For the purpose of illustrating a completely operative structure the switch here illustrated in detail in Figure 10 and which may be representative of the light control switch 41 or 50 is illustrated as having a relatively stiff switch blade 56 carrying a contact point 57 and a resilient blade 58 of greater length than the blade 56 and extending across the point 57 and biased to constantly move toward and into contact with the point 57, the blades being mounted upon a suitable body of insulation material 59. The button 45—54 engages the biased resilient blade 58 and flexes the blade away from and out of contact with the point 57 when it is engaged and pressed inwardly by the operating finger forming part of the bar 34.

For the motor control switches 42 and 51 the same switch construction may be employed with the blades reversed so that the engagement of the actuating buttons 45 or 52 will close the switches, the longer switch blades being biased to move away from the adjacent blade to open the switch when the buttons are released.

From the foregoing it will be readily apparent that there is provided in the present invention a novel and relatively simple apparatus for use in association with a pair of projectors of the character stated, wherein the lens tubes of the projectors through which the light beam passes will be alternately opened and closed by the operation of the motor 26 and at the same time the light of the operating projector will be turned on while the slide changing mechanism control or operating motor will be deenergized and in the adjacent projector the light will be turned off while the motor for such mechanism will be energized to change the slides. Thus after the machines have been set up and their magazines have been loaded with the desired group of picture slides and the motor 26 has been started the mechanism will function without further attention to change the pictures and operate the two projectors alternately until the magazines have been emptied of the picture slides.

We claim:

1. For the automatic operation of a pair of still picture projectors, each having an electric lamp and a picture slide changing mechanism operating electric motor; a shutter unit for each projector comprising a pair of pivotally mounted leaves adapted to be relatively oscillated to obstruct and clear the path of a light beam from the adjacent projector, a pivoted arm adjacent to each unit, an operative connection between the arm and the adjacent pair of leaves for effecting relative oscillation of the leaves upon swinging movement of the arm, a cam element movably supported in each housing adjacent to the arm therein, means forming a connection between each cam unit and the adjacent arm whereby movement of the cam unit in one direction will effect swinging movement of the arm, said cam units being constructed and arranged whereby one cam will move the adjacent arm to close the shutter leaves simultaneously with the movement by the other cam of the adjacent arm in a direction to open the shutter leaves, means for applying motive power to one of the cams, an operative connection between the said one of the cams and the other cam whereby the cams are operated in unison.

2. Mechanism of the character stated in claim 1 for operating a pair of still picture projectors, wherein one of said cams is a rotating cam and the other cam is a reciprocating cam and the connecting means between the cams comprises a bar extending from one housing to the other and supported for reciprocation and a rocking element forming an operative coupling between the said rotating cam and the bar.

3. Mechanism of the character stated in claim 1 for operating a pair of still picture projectors, wherein one of said cams is in the form of a rotating wheel and the other cam is a reciprocating cam and the said coupling between the cams comprises a two section extensible bar connected between the housings and carrying the reciprocating cam upon one end, and a pivoted bell crank having one arm operatively connected to the other end of the bar and a second arm engaged by the cam wheel whereby the cam wheel imparts rocking movement to the bell crank.

4. Apparatus of the character stated in claim 1 for operating a pair of still picture projectors of the type described, wherein the said connection between the cams comprises a bar extending from one housing to the other, a pair of switches in one housing, one of said switches being adapted to control the lamp of the adjacent projector and the other switch being adapted to control the mechanism operating motor of the adjacent projector, means carried by the bar for operating one switch when the bar is moved in one direction, means for reversely operating the other switch upon the movement of the bar in the said one direction, a pair of electric current controlling switches in the other housing, one of the switches of the second mentioned pair being adapted to control the electric lamp of the adjacent projector and the other switch of the second mentioned pair being adapted to control the mechanism operating electric motor of the adjacent projector, and means carried by the bar in the second mentioned housing for opening one of said switches of the second mentioned pair and closing the other one upon movement of the bar in the reversed direction.

CLARENCE J. CADWELL.
    FRANK M. ADAMSON.

REFERENCES CITED

The following references are of record in the file of this patent:

UNITED STATES PATENTS

| Number | Name | Date |
|---|---|---|
| 887,839 | Patterson | May 19, 1908 |
| 941,752 | Ashley | Nov. 30, 1909 |
| 947,471 | Klaiber | Jan. 25, 1910 |
| 1,060,128 | Roebuck | Apr. 29, 1913 |
| 1,257,986 | Englad | Mar. 5, 1918 |
| 2,297,532 | Brost et al. | Sept. 29, 1942 |
| 2,401,506 | Pechkranz | June 4, 1946 |